Dec. 16, 1969   N. E. ROGEN ET AL   3,483,752
TEMPERATURE MONITOR
Filed Feb. 10, 1967
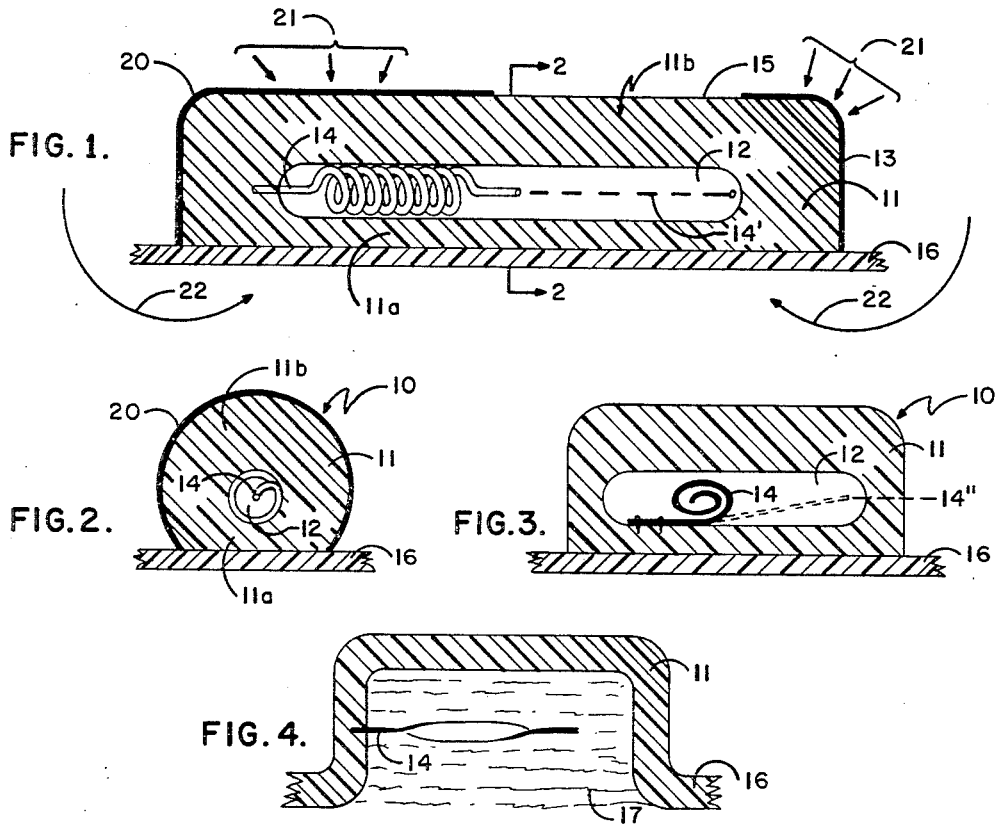
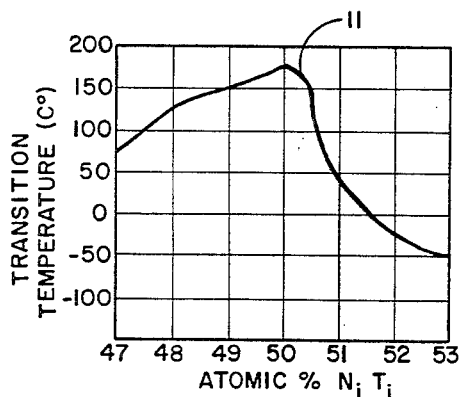
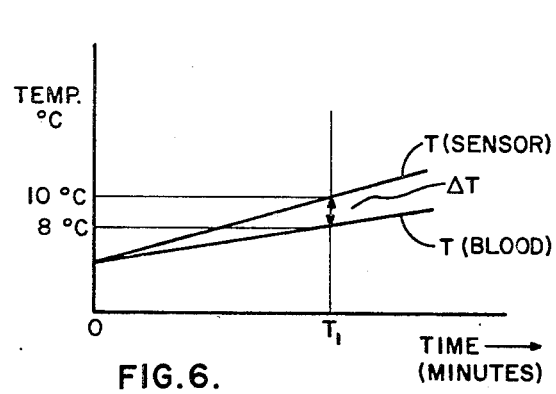
NEIL E. ROGEN
RUSSELL J. HILL
INVENTORS.
BY Charles M Hogan
Abraham Ogman
ATTORNEYS 3,483,752
TEMPERATURE MONITOR
Neil E. Rogen, Newton, and Russell J. Hill, Wilmington,
Mass., assignors to Avco Corporation, Cincinnati, Ohio,
a corporation of Delaware
Filed Feb. 10, 1967, Ser. No. 615,232
Int. Cl. G01k 3/00
U.S. Cl. 73—362.8                                5 Claims

ABSTRACT OF THE DISCLOSURE

A temperature monitor using a configuration change of a sensor to indicate that a predetermined temperature has been exceeded. The sensor is located in the housing that provides a preferential heat transfer path between the sensor and the object or medium being monitored and a preferential heat insulating path between the sensor and the ambient environment.

RELATED APPLICATIONS

The subject of this invention relates to the invention described and claimed in the co-pending application entitled, Temperature Indicating Device, Ser. No. 564,372 filed July 11, 1966, now Patent No. 3,440,997.

BACKGROUND OF THE INVENTION

This invention relates to temperature sensing devices in general and in particular to a temperature monitor which provides a clear, unambiguous indication that the medium being monitored has exceeded a predetermined temperature.

Temperature monitors are found in a variety of designs embodying numerous structural concepts.

The present invention is directed to one segment of the vast body of temperature monitors. It is best described and distinguished by performance and structural objectives.

It is an object of the invention to provide a temperature monitor which;

(1) Is passive, contains no electrical, mechanical or electromechanical parts, (2) Is dormant below a predetermined transition temperature, (3) Resolves small temperature differences accurately and reliably, (4) Provides an unambiguous indication that a predetermined transition temperature has been exceeded, (5) Is activated within a narrow temperature range so that it remains dormant while at the same time providing an unambiguous indication of this state near the transition temperature, (6) Is designed to follow temperature variations of a monitored medium so that no temperature differential or a designed temperature differential is maintained between the sensing element of the monitor and the medium being monitored, (7) Can be made simply and inexpensively so that it is disposable after use, and (8) Is suited to monitor whole blood during storage.

SUMMARY OF THE INVENTION

The invention comprises an indicator for monitoring the temperature of a medium. The indicator includes a sensor having a first configuration above a transition temperature but formed into a second configuration below the transition temperature. The sensor has the capability of changing rapidly from the second configuration to the first configuration at or near the transition temperature. The indicator also utilizes preferential heat conducting paths between the sensor and the monitored medium and preferential insulating paths between the sensor and the ambient environment to make the sensing element accurately follow temperature changes in the monitored medium.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is a cross-sectional representation of one form of a temperature monitor in which the second configuration of the sensing element is a spring-like coil and the first configuration is a substantially longitudinally extending wire.

FIGURE 2 is a cross-sectional representation taken along the lines 2—2 of the FIGURE 1 monitor.

FIGURE 3 is another cross-sectional representation of a monitor in which the sensing element is another coil-like configuration.

FIGURE 4 is another cross-sectional and yet another sensor configuration. In addition, the sensor housing is shown as an integral part of the medium container.

FIGURE 5 is a curve depicting the properties of a material which is capable of changing configuration at a predetermined transition temperature.

FIGURE 6 is a graph depicting the variation of temperature with time of the sensor and the monitored medium.

Nickel, iron and cobalt, when alloyed with titanium exhibit configuration memory capabilities. The preferred alloy is nickel titanium (NiTi) alloy in roughly equal proportions (atomic percent).

It is an alloy capable of (1) being shaped, (2) having the shape memorized, (3) being reshaped below a transition temperature, and (4) reverting to the memorized shape when the temperature of the material is raised to the transition temperature.

The transition temperature is a function of the alloy composition, as will be shown. The change in configuration occurs at or near the transition temperature and it occurs rapidly, within seconds.

In practice as will be seen, the proportions may vary from 47 to 53 atomic percent nickel. When this material is formed into a configuration and raised above 600° C., the configuration becomes "stored" or "memorized."

The configuration change occurs very rapidly over a very narrow temperature range in the vicinity of the nominal transition temperature.

Curve 11 in FIGURE 5 is a plot of transition temperature as a function of the NiTi alloy composition. The transition temperature changes as the proportion of the nickel and titanium change. It is quite obvious from curve 11 that transition temperature can be made to vary from 75° through 150° C. and down to −50° C. by a 6 atomic percent change in the proportions of nickel and titanium.

Referring to FIGURE 1 of the drawings there is shown a temperature monitor 10 comprising a housing 11 in which is situated a sensor 14.

The housing 11 is constructed with a thin wall section 11a and a thick wall section 11b which define a compartment 12. The housing 11 is preferably constructed of a transparent material such as an acrylic plastic. A window 15 is defined by a surface coating 20 which can be a heat reflected coating or a heat absorbing coating for reasons which will be explained hereinafter. The temperature monitor 10 is shown attached to the wall 16 of a container which in turn holds the medium, the temperature of which is being monitored.

The compartment 12 contains a sensor 14 formed from a material of the type previously described and preferably nickel titanium. The sensor 14 is formed into a second configuration, a spring-like coil. The symbol 14' designates the first configuration, a substantially longitudinal wire into which the spring 14 changes when the transition temperature is reached.

In the subsequent FIGURES 2 through 4 like numerals represent like structural parts. FIGURE 3 shows the sensor 14 having a second configuration in the form of a coil formed from a strip of material and a first configuration 14" as a substantially flat strip.

In FIGURE 4 the sensor 14 is a flat strip which has been twisted 180°. Its first configuration would most generally be a flat strip without a twist. In addition, the housing 11 of FIGURE 4 is shown as an integral part of the medium contained and symbol 17 represents the medium as a fluid in which the sensor 14 is emersed.

The invention was conceived as an answer to a serious problem in connection with monitoring whole blood. It is quite clear that the monitor will perform satisfactorily in other applications of a general monitoring nature. It represents, however, the only known solution to the problem of providing a monitor which requires a very decisive and rapid response when actuated at a specific temperature, yet remain dormant at temperatures close to the transition temperature.

Whole blood is stored under refrigeration. Instructions require continuous storage at 4° to 6° C. Whole blood is collected in plastic bags and bottles that are sealed and not reopened until used. Blood that has reached a temperature of 10° C. is unusable. Whole blood is discarded in great quantities because it is not possible to warrant or know for certain that during storage the temperature of the blood did not exceed 10° C. Typically, when removed from storage, the container of blood becomes unusable in from 15 to 30 minutes.

To provide a useful monitor device, certain restrictions had to be met. The sensor had to comprise a thermal analog of the blood bag or bottle. With the blood bag the monitor must operate through the walls of the bag since it is not possible to insert anything within the blood bag after it has been sealed. The monitor must also respond decisively in response to a small temperature change, but otherwise remain dormant.

Obviously, conventional, bi-metallic devices per se are inadequate. To convert bi-metallic devices into thermostatic devices that resolve a small temperature change generally involves ancillary parts at additional expense and structural complexity, namely the household thermostat.

Another design parameter of this novel monitor is the necessity that the sensing device be a virtual slave to the medium being monitored, that is to say, it must sense quickly and accurately changes of temperature in the medium since, in the case of whole blood, spoilage occurs quickly. Additionally, the sensor can be made to increase in temperature as a function of time slightly more rapidly than the medium to provide for a safety factor without added cost or complexity. That is to say, the sensor is actuated at a slightly higher temperature than the blood so that there can be no doubt that the blood is either safe or unfit for use.

Considering the fact that in this particular application all of the foregoing functions must be reliably performed over a temperature range not exceeding 6° C. and further considering that the application calls for a completely passive discardable monitor, the performance achieved by the concept described herein is indeed remarkable.

Part of the solution resides in the use of the nickel titanium alloy which is capable of responding decisively. Part of the solution is provided forming a preferential heat conducting path between the medium and the sensor as designated by arrows 22 in FIGURE 1 while at the same time constructing a preferential heat insulating path between the sensor and its ambient environment as depicted by arrows 21.

It is quite clear that heat conducting can be accelerated by substituting a metal plate for the wall 11a. The paint coating 20 can be made reflective to retard heat transmission through the wall 11b or it can be made heat absorbative to encourage heat transmission to the wall 11b. Having disclosed the methods for overcoming the restraints on a monitor of this type, the exact proportions of walls 11a and 11b can be ascertained for each application.

To illustrate, a working embodiment of the FIGURE 4 sensor configuration in a FIGURE 1 housing for the whole blood storage and monitoring application was made. An acrylic rod 2" long and ¾ of an inch in diameter was used.

One-eighth of an inch was taken off the diameter to construct the thin wall 11a.

The rod is further bored to provide a compartment 12 for a sensor 14. When secured to a container the sensor will remain in the coiled configuration 14 so long as the temperature of the container contents as reflected through the container wall remains below the transition temperature.

When the container contents reaches the transition temperature the coil snaps to the flat strip configuration 14". The process is not reversible and the sensor remains a flat strip 14" even if the temperature is lowered below the transition temperature.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention.

What is claimed is:

1. An indicator for monitoring the temperature of a medium comprising:
   a sensor having the first configuration above a transition temperature and formed into a second configuration below said transition temperature, said sensor having the capability of changing irreversibly and substantially instantaneously from the second configuration to said first configuration at the transition temperature;
   and a housing containing said sensor including thin wall means for preferentially conducting heat between said sensor and the monitored medium and thick wall means for preferentially insulating said sensor from the ambient environment, said thick and thin wall means being proportioned to cause said sensor to measure essentially the temperature of the medium independently of the ambient temperature.

2. An indicator for remotely monitoring the condition of blood contained within a bag comprising:
   a sensor having a first configuration above a transition temperature and formed into a second configuration below said transition temperature, said sensor having the capability of changing irreversibly and substantially instantaneously from the second configuration to said first configuration at the transition temperature;
   a housing containing said sensor having thick and thin wall portions;
   heat coupling means including said thin wall portion and a wall of the bag for preferentially transferring heat from the inside of the bag to and from the sensor;
   heat insulating means including said thick wall portion for preferentially insulating the sensor from the ambient environment, said heat coupling means and said insulating means being proportioned to provide a positive temperature difference between the blood and the sensor within prescribed temperature limits, the temperature of the sensor being maintained at a higher temperature than said blood where the ambient temperature is above the blood.

3. An indicator as described in claim 2 in which said positive difference does not exceed 2° C.

4. An indicator for monitoring the condition of blood contained within a bag comprising:

a sensor having a first configuration above a transition temperature and formed into a second configuration below said transition temperature, said sensor having the capability of changing from the second configuration to said first configuration at the transition temperature, one of said configurations being a coil and the other of said configurations is a linear member;

heat coupling means for preferentially transferring heat from the inside of the bag to and from the sensor; and heat insulating means for preferentially insulating the sensor from the ambient environment.

5. An indicator for monitoring the condition of blood contained within a bag comprising:

a sensor having a first configuration above a transition temperature and formed into a second configuration below said transition temperature, said sensor having the capability of changing from the second configuration to said first configuration at the transition temperature, one of said configurations is a flat strip and the other configuration includes an end portion which is twisted 180 degrees in relation to the other end;

heat coupling means for preferentially transferring heat from the inside of the bag to and from the sensor; and heat insulating means for preferentially insulating the sensor from the ambient environment.

References Cited

UNITED STATES PATENTS

| | | | |
|---|---|---|---|
| 2,755,666 | 7/1956 | Muncheryan | 73—362.8 |
| 3,174,851 | 3/1965 | Buehler | 75—170 |
| 3,291,617 | 12/1966 | Barker et al. | 73—378.3 |

LOUIS R. PRINCE, Primary Examiner

DENIS E. CORR, Assistant Examiner

U.S. Cl. X.R.

73—343, 378.3